Oct. 31, 1933.  H. J. KARP  1,933,144
COMBINED CABINET AND FOLDING TABLE
Filed July 25, 1932  3 Sheets-Sheet 1

Inventor
Henry J. Karp
By his Attorneys
Merchant Kiern

Oct. 31, 1933.  H. J. KARP  1,933,144
COMBINED CABINET AND FOLDING TABLE
Filed July 25, 1932    3 Sheets-Sheet 2
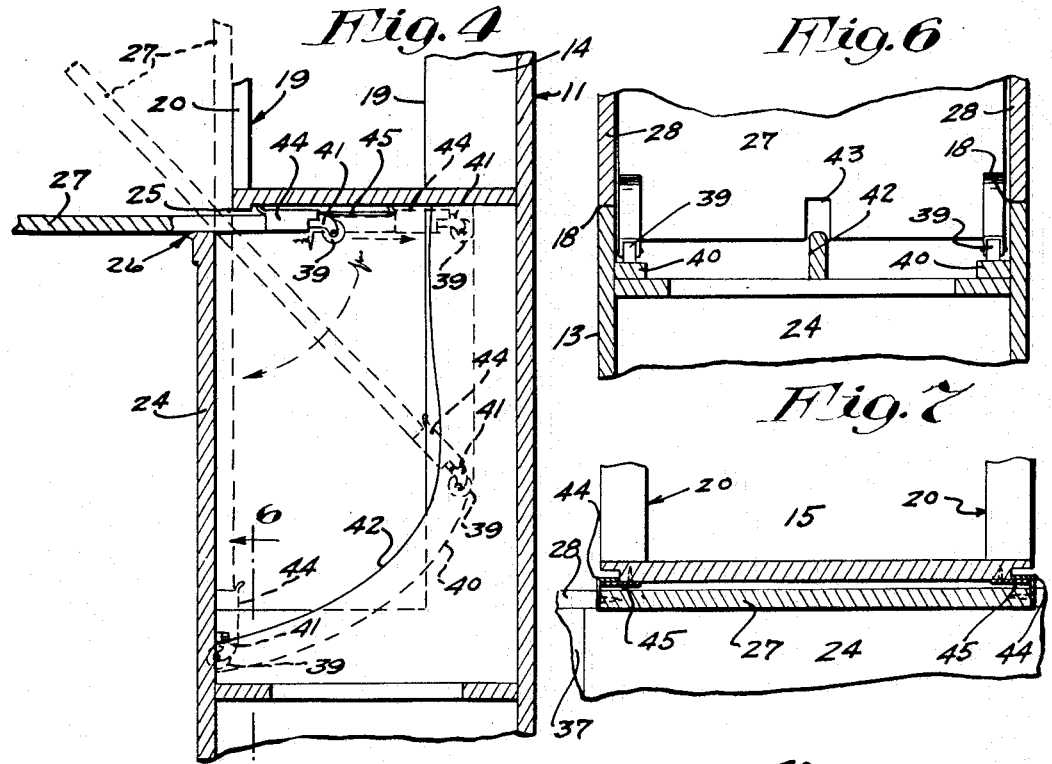
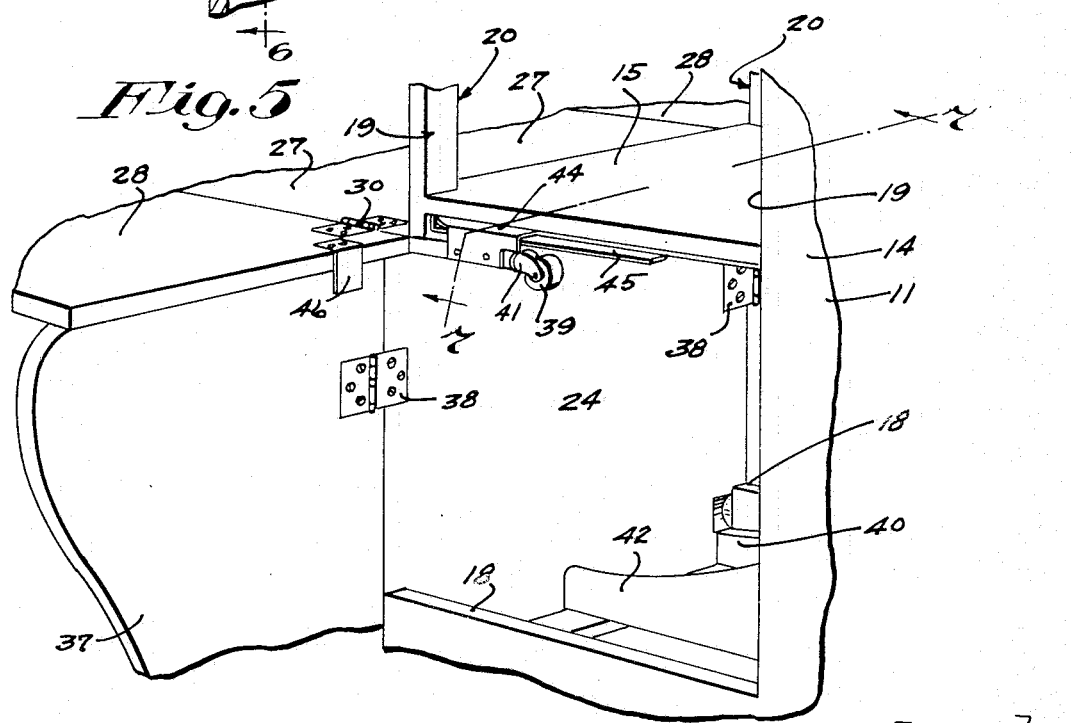
Inventor
Henry J. Karp
By his Attorneys Oct. 31, 1933.  H. J. KARP  1,933,144
COMBINED CABINET AND FOLDING TABLE
Filed July 25, 1932  3 Sheets-Sheet 3

Inventor
Henry J. Karp
By his Attorneys

Patented Oct. 31, 1933

1,933,144

UNITED STATES PATENT OFFICE 1,933,144

COMBINED CABINET AND FOLDING TABLE

Henry J. Karp, Faribault, Minn., assignor to Kenneth Karp, Faribault, Minn.

Application July 25, 1932. Serial No. 624,423

3 Claims. (Cl. 312—161)

My present invention has for its object the provision of an extremely simple and highly efficient combined cabinet and folding table.

To the above end, the invention consists of the novel devices and combinations of devices hereinafter described and defined in the claims.

In the accompanying drawings, which illustrate the invention, like characters indicate like parts throughout the several views.

Referring to the drawings:

Fig. 4 is a fragmentary view principally in section taken on the line 4—4 of Fig. 2, on an enlarged scale;

Fig. 5 is a fragmentary perspective view of the parts shown in Fig. 4, on an enlarged scale;

Fig. 6 is a fragmentary detail view in section taken on the line 6—6 of Fig. 4, and illustrating the table top folded;

Fig. 7 is a fragmentary detail view in section taken on the line 7—7 of Fig. 5;

Figure 1:
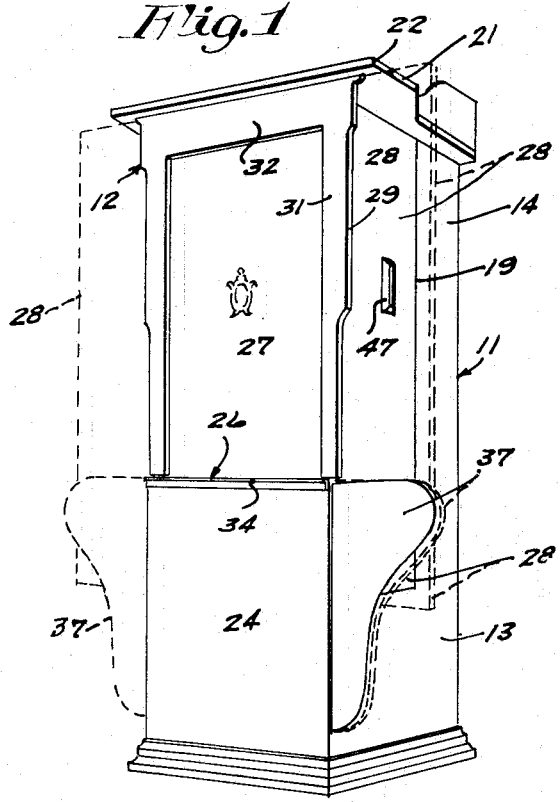
Fig. 1 is a perspective view of the invention with the table folded, some parts shown in different positions by means of broken lines.
Figure 3:
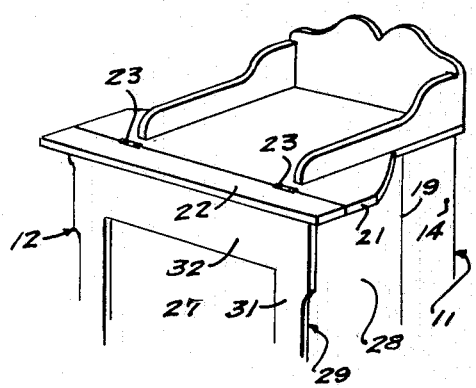
Fig. 3 is a fragmentary perspective view of the top portion of the cabinet.
Figure 2:
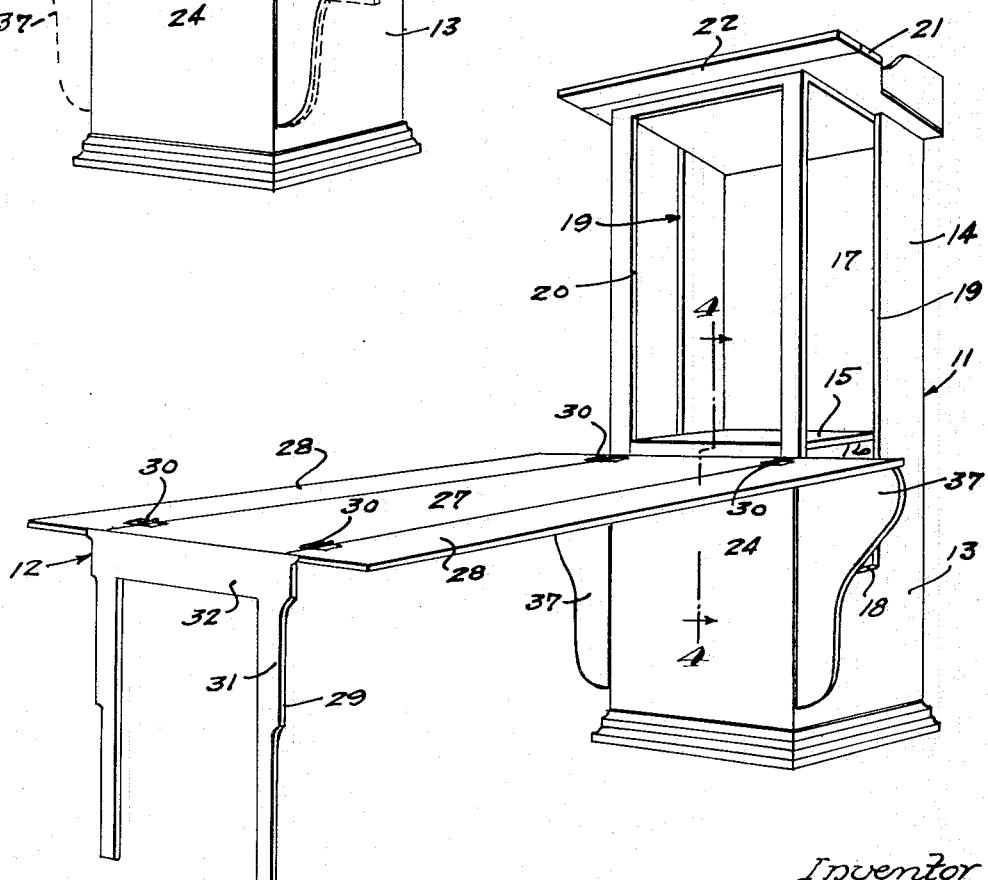
Fig. 2 is a perspective view corresponding to Fig. 1 with the exception that the table is unfolded and in an operative position.
Figure 8:
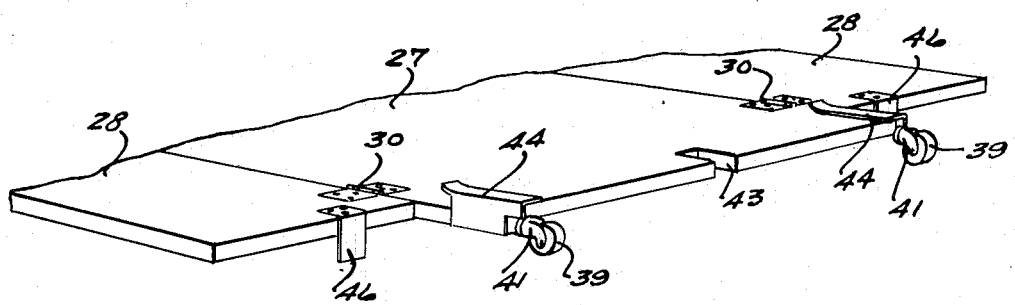
Fig. 8 is a fragmentary perspective view of the rear end portion of the table top and leaves.

The numerals 11 and 12 indicate, respectively, the cabinet and the folding table. Said cabinet is relatively high, rectangular in cross-section and includes a base section 13 and a top section 14. A horizontal shelf 15 in the cabinet 11 forms the top of the base section 13 and the bottom of the top section 14. The compartment formed by the base section 13 is indicated by the numeral 16 and the compartment formed by the top section 14 is indicated by the numeral 17. The compartment 16 is substantially entirely closed except for a rectangular access opening 18 in each side of the base section 13 at the upper front corner thereof. In the sides of the top section 14 are access openings 19 that form continuations of the openings 18 and extend to the top of said section. Substantially the entire front of the top section 14 is open and affords an access opening 20 that extends from the shelf 15 to the top of said section. The top 21 of the cabinet 11 has a transverse section 22 which projects forward and outward of said cabinet and is hinged thereto at 23 for raising and lowering movements.

Obviously the compartment 18 is a sort of secret compartment and the compartment 17 may be provided with shelves, drawers or other holding or supporting means.

By reference to Fig. 4, it will be noted that the front member 24 of the base 13 is forwardly offset from the front of the top section 14 and its upper end is spaced below the under side of the shelf 15 to form a passageway 25 for the top of the table and the upper end of said front member affords a supporting ledge 26 for the table top.

Referring now in detail to the folding table 12 the same includes a top 27, a pair of leaves 28 and a front leg bracket 29. The leaves 28 are hinged at 30 to the longitudinal edge portions of the top 27. These hinges 30 are arranged to hold the leaves 28 in the plane of the top 27, when the table 12 is unfolded, but permit upward swinging movement thereof. The leg bracket 29 comprises a pair of legs 31, that are flat in the plane of said bracket, and a cross-tie rail 32 that rigidly connects said legs at their upper ends. Hinges 33 secure the leg bracket 29 to the front end of the top 27 for folding movement onto the under side thereof, when the table 12 is unfolding, so that, when said table is folded, the leg bracket 29 will hinge in front of the top 27. Obviously when the table 12 is folded its top 27 has the appearance of a panel and the leg bracket 29 and the moulding 34 on the upper outer horizontal edge of the front base member 24 give the appearance of a frame for said panel, see Fig. 1.

Figure 10:
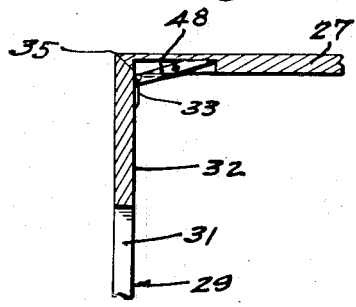
Fig. 10 is a fragmentary detail view in section taken on the line 10—10 of Fig. 9.

The outer end of the top 27 and the upper inner longitudinal edge portion of the leg bracket 29 have opposing beveled surfaces, as indicated at 35, see Fig. 10. These beveled surfaces 35 act as stops to limit the swinging movement of the leg bracket 29 into an operative position and position the same perpendicular to the top 27. The top 27, at its inner end portion, is supported, when in an operative position, on the ledge 26 with freedom for compound endwise sliding movement and vertical swinging movement into an upright position in which its lower end portion is within the compartment 16 and its upper end portion forms a closure for the access opening 20. The shelf 15 prevents lifting movement of the table top 27 from the ledge 26 and the base front member 24 holds the top 27 when the table 12 is folded against the front of the top section 14.

Figure 9:
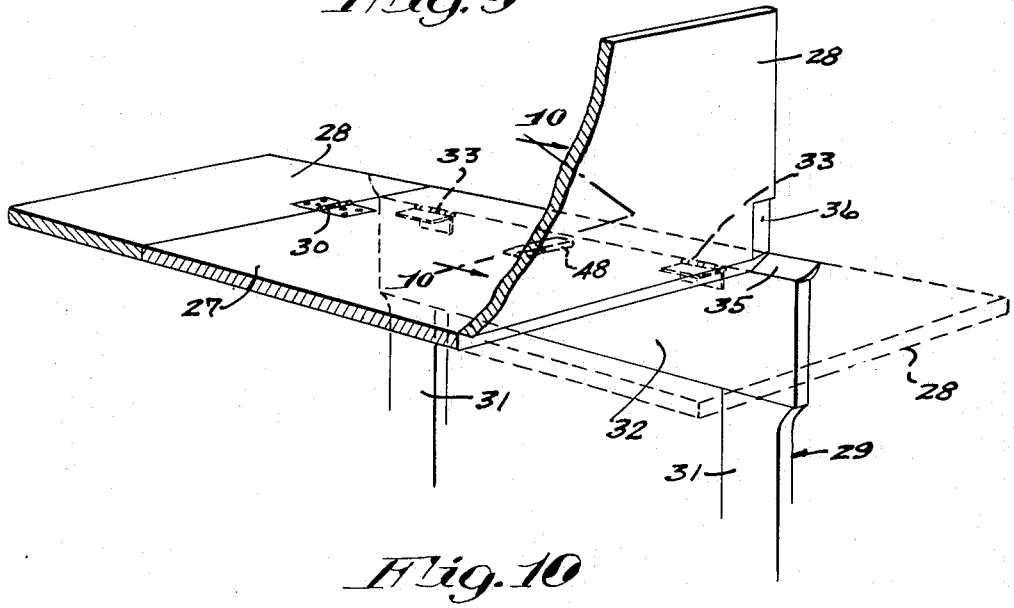
Fig. 9 is a fragmentary perspective view of the front end portion of the table top and leaves with one of the leaves shown in a raised position by means of full lines and in an operative position by means of broken lines.

By reference to Fig. 9 it will be noted that the leg bracket 29 is wider than the top 27 and supports the leaves 28 at their front ends when the table 12 is unfolded and that said leaves are beveled at 36 to receive the leg bracket 29 at its beveled surface 35.

A pair of wings 37 are secured to the base section 13 by a pair of offset hinges 38 and support the leaves 28 at their rear ends. These wings 37 when in operative positions extend outward from the sides of the base section 13 in the plane of its front member 24. When the table 12 is folded the wings 37 are folded onto the folded leaves 28 at the sides of the cabinet 11.

When the table 12 is folded its top 12, as previously stated, closes the access opening 20 and the leaves 28 are folded perpendicular to said top into the access openings 18 and 19 and afford closures therefore.

During the swinging movement of the table 12, to and from a folded position and when folded, it is supported by a pair of wheels 39 arranged to run on a pair of curved rails 40 in the compartment 16. These wheels 39 are journaled on brackets 41 rigidly secured to the inner end of the top 27 and hold said wheels outward of said top and substantially in the plane thereof.

The top 27 during the travel of the wheels on the rails 40 is held against transverse movement by a curved guide 42 which extends into a notch 43 in the rear end of said top.

After the table 12 is unfolded the same has an outward endwise movement from the cabinet 11 to increase its operative length. During the endwise movement of the table 12 the same slides on the supporting ledge 26 and is guided by a pair of shoes 44 arranged to run on a pair of guide rails 45. The shoes 44 are rigidly secured to the inner end of the top 27, at the longitudinal edges thereof, and the rails 45 are rigidly secured to the shelf 15, see Figs. 5 and 7. These shoes 44 and rails 45 hold the table 12 when unfolded against angular movement in a horizontal plane with respect to the cabinet 11.

The curvature of the rails 40 is such as to move the table 12 bodily endwise outward during the unfolding thereof and the downward swinging movement of the table 12 is limited by the engagement of the shoes 44 with the shelf 15 at its under side and positions the top 27 in a horizontal position. At the time the shoes 44 engage the shelf 15 as a stop the shoes 44 are positioned back of the rear ends of the rails 45 and automatically aligned therewith so that outward endwise movement of the table 12 will draw the shoes 44 onto the rails 45. The engagement of the shoes 44 with the front ends of the rails 45, which are turned up, limits the outward endwise movement of the table 12.

Stop lugs 46 on the rear ends of the leaves 28 prevent the wings 37 from being accidentally folded and thus removing the support for said leaves. Handles 47 on the leaves 28 afford convenient means by which said leaves are opened or closed. During the folding of the table 12, the hinged top section 22 will be slightly lifted by the engagement of the top 27 therewith and permit said top to pass thereunder and then drop onto the upper end of said top to form a tight joint therewith. In place of the hinged section 22 the top 21 at its under side may be grooved to provide clearance for the top 27.

From the above description, it is evident that the table 12 when folded, affords a complete closure for the several access openings in the cabinet 11 and all semblance of the table has disappeared leaving only a closed cabinet of artistic design. A gravity-actuated latch 48 is provided for holding the leg bracket 29 in an operative position.

What I claim is:

1. In a device of the class described, a cabinet, a folding table, the inner end portion of which extends into the cabinet, said table being supported on a part of the cabinet for vertical swinging movement from a horizontal position to a vertical position and for bodily endwise movement into the cabinet during its movement to a vertical position and for bodily endwise movement variable distances out of the cabinet when in a horizontal position, and a separable coupler connecting the table to the cabinet and holding the inner end portion of the table against transverse movement when in a horizontal position, the members of said coupler being constructed and arranged to be separated by an endwise movement of the table into the cabinet and to be interlocked by an endwise movement of the table out of the cabinet.

2. The structure defined in claim 1 which further includes a track in the cabinet and a wheel on the table arranged to run on the track, said track being arranged to lower the table into the cabinet during its swinging movement into a vertical position and to positively move the table endwise out of the cabinet during its swinging movement into a horizontal position, said wheel being separable from the track to permit the table to be moved bodily endwise when in a horizontal position.

3. In a device of the class described, a cabinet having an access opening in its front member and an access opening in each of its side members, a folding table supported by a part of the cabinet for swinging movement to and from a vertical position in which it affords a closure for the access opening in the front of the cabinet, a pair of leaves hinged to the table for folding movement onto the sides of the cabinet, said leaves when folded onto the cabinet afford a closure for the access openings in the sides of the cabinet, and wings hinged to the cabinet for supporting the leaves when the table is in a horizontal position and for folding movement onto the sides of the cabinet when the table is in a vertical position.

HENRY J. KARP.